(12) United States Patent
Zhao et al.

(10) Patent No.: US 7,825,610 B2
(45) Date of Patent: Nov. 2, 2010

(54) LED DRIVER WITH DYNAMIC POWER MANAGEMENT

(75) Inventors: Bin Zhao, Irvine, CA (US); Jack W. Cornish, Foothill Ranch, CA (US); Brian B. Horng, Irvine, CA (US); Victor K. Lee, Irvine, CA (US); Andrew M. Kameya, Irvine, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 229 days.

(21) Appl. No.: 12/056,237

(22) Filed: Mar. 26, 2008

(65) Prior Publication Data
US 2009/0230891 A1    Sep. 17, 2009

Related U.S. Application Data

(60) Provisional application No. 61/036,053, filed on Mar. 12, 2008.

(51) Int. Cl.
*H05B 37/02* (2006.01)
(52) U.S. Cl. ............... 315/299; 315/185 S; 315/308; 315/312; 315/360
(58) Field of Classification Search ............. 315/185 R, 315/185 S, 209 R, 210, 224, 225, 226, 246, 315/247, 291, 294, 299, 302, 307, 308, 312, 315/324, 360
See application file for complete search history.

(56) References Cited

U.S. PATENT DOCUMENTS

| | | | |
|---|---|---|---|
| 4,162,444 A | 7/1979 | Rodgers | |
| 4,615,029 A | 9/1986 | Hu et al. | |
| 4,649,432 A | 3/1987 | Watanabe et al. | |
| 4,686,640 A | 8/1987 | Simison | |
| 5,025,176 A | 6/1991 | Takeno | |
| 5,038,055 A | 8/1991 | Kinoshita | |
| 5,508,909 A | 4/1996 | Maxwell et al. | |
| 5,723,950 A | 3/1998 | Wei et al. | |
| 6,281,822 B1 | 8/2001 | Park | |
| 6,864,641 B2 * | 3/2005 | Dygert | 315/216 |

(Continued)

FOREIGN PATENT DOCUMENTS

JP    2003332624 A    11/2003

(Continued)

OTHER PUBLICATIONS

International Appl. No. PCT/US2009/035284, Search Report and Written Opinion, Oct. 28, 2009.

(Continued)

*Primary Examiner*—Thuy Vinh Tran (57) ABSTRACT

Power management in a light emitting diode (LED) system having a plurality of LED strings is disclosed. A voltage source provides an output voltage to drive the LED strings. An LED driver monitors the tail voltages of the active LED strings to identify the minimum, or lowest, tail voltage and adjusts the output voltage of the voltage source based on the lowest tail voltage. The LED driver can adjust the output voltage so as to maintain the lowest tail voltage at or near a predetermined threshold voltage so as to ensure that the output voltage is sufficient to properly drive each active LED string with a regulated current in view of pulse width modulation (PWM) performance requirements without excessive power consumption.

20 Claims, 9 Drawing Sheets

U.S. PATENT DOCUMENTS

| | | | |
|---|---|---|---|
| 6,943,500 | B2 | 9/2005 | LeChevalier |
| 7,262,724 | B2 | 8/2007 | Hughes et al. |
| 7,391,280 | B2 | 6/2008 | Hsu |
| 7,436,378 | B2 | 10/2008 | Ito et al. |
| 7,511,545 | B1 | 3/2009 | Kesler |
| 2004/0208011 | A1 | 10/2004 | Horiuchi et al. |
| 2004/0233144 | A1 | 11/2004 | Rader et al. |
| 2006/0186830 | A1 | 8/2006 | Shami et al. |
| 2007/0080911 | A1* | 4/2007 | Liu et al. .................. 345/82 |
| 2007/0253330 | A1 | 11/2007 | Tochio et al. |
| 2008/0054815 | A1 | 3/2008 | Kotikalapoodi et al. |
| 2008/0297067 | A1* | 12/2008 | Wang et al. ............. 315/294 |
| 2009/0128045 | A1* | 5/2009 | Szczeszynski et al. .. 315/185 R |
| 2009/0187925 | A1* | 7/2009 | Hu et al. ................. 719/327 |
| 2009/0230874 | A1 | 9/2009 | Zhao et al. |
| 2009/0273288 | A1 | 11/2009 | Zhao et al. |
| 2009/0315481 | A1 | 12/2009 | Zhao |
| 2010/0026203 | A1 | 2/2010 | Zhao et al. |
| 2010/0085295 | A1 | 4/2010 | Zhao et al. |

FOREIGN PATENT DOCUMENTS

| | | | |
|---|---|---|---|
| JP | 2005116199 | A | 4/2005 |
| WO | 2005022596 | A2 | 3/2005 |

OTHER PUBLICATIONS

Mc Nerney, Tim, "constant-current power supply for Luxeon 5W LED with low-voltage warning and shut-off Software Documentation, as shipped to Mali in first 45 prototypes," Nov. 2004, www.designthatmatters.org/ke/pubs/kled-doc.txt, 5 pages.

Maxim: "Application Note 810, Understanding Flash ADCs," Oct. 2, 2001, 8 pages.

National Semiconductor Data Sheet: "LM3432/LM3432B 6-Channel Current Regulator for LED Backlight Application," May 22, 2008, pp. 1-18.

U.S. Appl. No. 12/537,443, filed Aug. 7, 2009, entitled "Pulse Width Modulation Frequency Conversion".

U.S. Appl. No. 12/703,239, filed Feb. 10, 2010, entitled "Pulse Width Modulation With Effective High Duty Resolution".

U.S. Appl. No. 12/537,692, filed Aug. 7, 2009, entitled "Phase-Shifted Pulse Width Modulation Signal Generation".

U.S. Appl. No. 12/625,818, filed Nov. 25, 2009, entitled "Synchronized Phase-Shifted Pulse Width Modulation Signal Generation".

U.S. Appl. No. 12/703,249, filed Feb. 10, 2010, entitled "Duty Transition Control in Pulse Width Modulation Signaling".

Luke Huiyong Chung, Electronic Products: "Driver ICs for LED BLUs," May 1, 2008, 3 pages.

Akira Takahashi, Electronic Products: "Methods and features of LED drivers," Mar. 2008, 3 pages.

U.S. Appl. No. 12/340,985, filed Dec. 22, 2008, entitled "LED Driver With Feedback Calibration".

U.S. Appl. No. 12/326,963, filed Dec. 3, 2008, entitled "LED Driver With Precharge and Track/Hold".

U.S. Appl. No. 12/367,672, filed Feb. 9, 2009, entitled " Configuration for Dynamic Power Control in LED Displays".

U.S. Appl. No. 12/424,326, filed Apr. 15, 2009, entitled "Peak Detection With Digital Conversion".

U.S. Appl. No. 12/504,841, filed Jul. 17, 2009, entitled "Analog-To-Digital Converter With Non-Uniform Accuracy".

U.S. Appl. No. 12/690,972, filed Jan. 21, 2010, entitled "Serial Cascade on Minimum Tail Voltages of Subsets of LED Strings for Dynamic Power Control in LED Displays".

U.S. Appl. No. 12/363,607, filed Jan. 30, 2009, entitled "LED Drive With Dynamic Headroom Control".

International Application No. PCT/US2009/035284, Search Report and Written Opinion, Oct. 28, 2009, 11 pages.

Texas Instruments Publication, "Interleaved Dual PWM Controller with Programmable Max Duty Cycle," SLUS544A, (UCC28220, UCC28221) Sep. 2003, pp. 1-28.

International App. No. PCT/US2009/065913, Search Report mailed Jul. 7, 2010, 4 pages.

\* cited by examiner

LED DRIVER WITH DYNAMIC POWER MANAGEMENT

CROSS-REFERENCE TO RELATED APPLICATION

The present application claims priority to U.S. Provisional Patent Application No. 61/036,053, filed Mar. 12, 2008 and having common inventorship, the entirety of which is incorporated by reference herein.

FIELD OF THE DISCLOSURE

The present disclosure relates generally to light emitting diodes (LEDs) and more particularly to LED drivers.

BACKGROUND

Light emitting diodes (LEDs) often are used for backlighting sources in liquid crystal displays (LCDs) and other displays. In backlighting implementations, the LEDs are arranged in parallel "strings" driven by a shared voltage source, each LED string having a plurality of LEDs connected in series. To provide consistent light output between the LED strings, each LED string typically is driven at a regulated current that is substantially equal among all of the LED strings.

Although driven by currents of equal magnitude, there often is considerable variation in the bias voltages needed to drive each LED string due to variations in the static forward-voltage drops of individual LEDs of the LED strings resulting from process variations in the fabrication and manufacturing of the LEDs. Dynamic variations due to changes in temperature when the LEDs are enabled and disabled also can contribute to the variation in bias voltages needed to drive the LED strings with a fixed current. In view of this variation, conventional LED drivers typically provide a fixed voltage that is sufficiently higher than an expected worst-case bias drop so as to ensure proper operation of each LED string. However, as the power consumed by the LED driver and the LED strings is a product of the output voltage of the LED driver and the sum of the currents of the individual LED strings, the use of an excessively high output voltage by the LED driver unnecessarily increases power consumption by the LED driver. Accordingly, an improved technique for driving LED strings would be advantageous.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-12 illustrate example techniques for power management in a light emitting diode (LED) system having a plurality of LED strings. A voltage source provides an output voltage to drive the LED strings. An LED driver monitors the tail voltages of the LED strings to identify the minimum, or lowest, tail voltage and adjusts the output voltage of the voltage source based on the lowest tail voltage. In at least one embodiment, the LED driver adjusts the output voltage so as to maintain the lowest tail voltage at or near a predetermined threshold voltage so as to ensure that the output voltage is sufficient to properly drive each active LED string with a regulated current in view of pulse width modulation (PWM) timing requirements without excessive power consumption.

The term "LED string," as used herein, refers to a grouping of one or more LEDs connected in series. The "head end" of a LED string is the end or portion of the LED string which receives the driving voltage/current and the "tail end" of the LED string is the opposite end or portion of the LED string. The term "tail voltage," as used herein, refers the voltage at the tail end of a LED string or representation thereof (e.g., a voltage-divided representation, an amplified representation, etc.).

Figure 1:
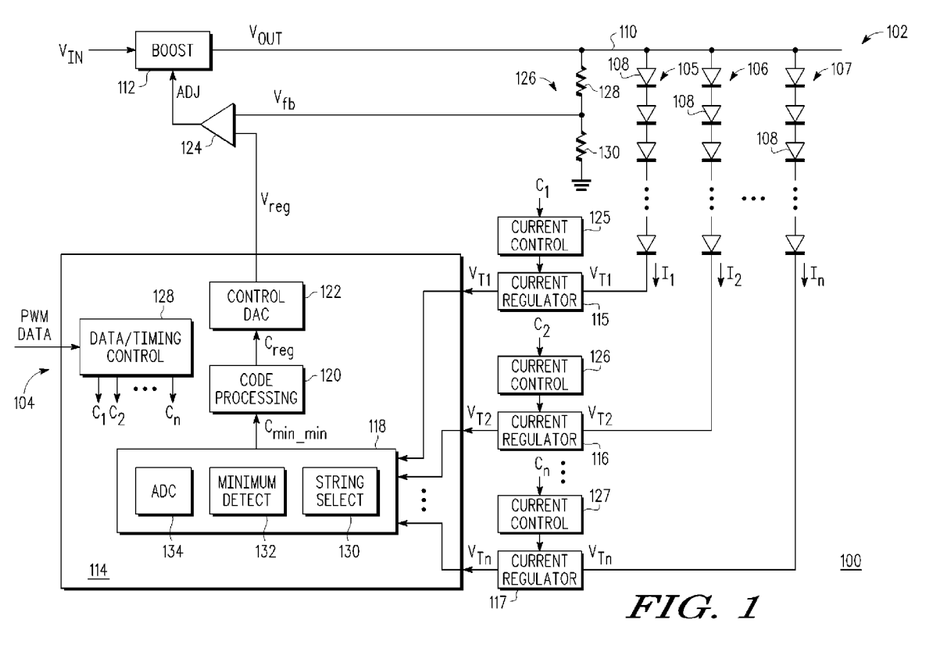
FIG. 1 is a diagram illustrating a light emitting diode (LED) system having dynamic power management in accordance with at least one embodiment of the present disclosure.

FIG. 1 illustrates a LED system 100 having dynamic power management in accordance with at least one embodiment of the present disclosure. In the depicted example, the LED system 100 includes a LED panel 102, a LED driver 104, and a voltage source for providing an output voltage to drive the LED panel 102. The LED panel 102 includes a plurality of LED strings (e.g., LED strings 105, 106, and 107). Each LED string includes one or more LEDs 108 connected in series and each LED string is driven by the adjustable voltage $V_{OUT}$ received at the head end of the LED string via a voltage bus 110 (e.g., a conductive trace, wire, etc.). In the embodiment of FIG. 1, the voltage source is implemented as a boost converter 112 configured to drive an output voltage $V_{OUT}$ using an input voltage $V_{IN}$. The LEDs 108 can include, for example, white LEDs, red, green, blue (RGB) LEDs, organic LEDs (OLEDs), etc.

The LED driver 104 includes a feedback controller 114 configured to control the boost converter 112 based on the tail voltages at the tail ends of the LED strings 105-107. As described in greater detail below, the LED driver 104, in one embodiment, receives pulse width modulation (PWM) data representative of which of the LED strings 105-107 are to be activated and at what times during a corresponding PWM cycle, and the LED driver 104 is configured to individually activate the LED strings 105-107 at the appropriate times in their respective PWM cycles based on the PWM data.

The feedback controller 114, in one embodiment, includes a plurality of current regulators (e.g., current regulators 115, 116, and 117), a code generation module 118, a code processing module 120, a control digital-to-analog converter (DAC) 122, an error amplifier (or comparator) 124, and a data/timing control module 128 (illustrated in FIG. 1 as part of the feedback controller 114).

In the example of FIG. 1, the current regulator 115 is configured to maintain the current $I_1$ flowing through the LED string 105 at or near a fixed current (e.g., 30 mA) when active. Likewise, the current regulators 116 and 117 are configured to maintain the current $I_2$ flowing through the LED string 106 when active and the current $I_n$ flowing through the LED string 107 when active, respectively, at or near the fixed current. The current control modules 125, 126, and 127 are configured to activate or deactivate the LED strings 105, 106, and 107, respectively, via the corresponding current regulators.

The data/timing control module 128 receives the PWM data and is configured to provide control signals to the other components of the LED driver 104 based on the timing and activation information represented by the PWM data. To illustrate, the data/timing control module 128 provides control signals $C_1$, $C_2$, and $C_n$ to the current control modules 125, 126, and 127, respectively, to control which of the LED strings 105-107 are active during corresponding portions of their respective PWM cycles. The data/timing control module 128 also provides control signals to the code generation module 118, the code processing module 120, and the control DAC 122 so as to control the operation and timing of these components. The data/timing control module 128 can be implemented as hardware, software executed by one or more processors, or a combination thereof. To illustrate, the data/timing control module 128 can be implemented as a logic-based hardware state machine.

The code generation module 118 includes a plurality of tail inputs coupled to the tail ends of the LED strings 105-107 to receive the tail voltages $V_{T1}$, $V_{T2}$, and $V_{Tn}$ of the LED strings 105, 106, and 107, respectively, and an output to provide a code value $C_{min\_min}$. In at least one embodiment, the code generation module 118 is configured to identify or detect the minimum, or lowest, tail voltage of the LED strings 105-107 that occurs over a PWM cycle or other specified duration and generate the digital code value $C_{min\_min}$ based on the identified minimum tail voltage. In the disclosure provided herein, the following nomenclature is used: the minimum of a particular measured characteristic over a PWM cycle or other specified duration is identified with the subscript "min_min", thereby indicating it is the minimum over a specified time span; whereas the minimum of a particular measured characteristic at a given point in time or sample point is denoted with the subscript "min." To illustrate, the minimum tail voltage of the LED strings 105-107 at any given point in time or sample point is identified as $V_{Tmin}$, whereas the minimum tail voltage of the LED strings 105-107 for a given PWM cycle (having one or more sample points) is identified as $V_{Tmin\_min}$. Similarly, the minimum code value determined at a given point in time or sample point is identified as $C_{min}$, whereas the minimum code value for a given PWM cycle (having one or more sample points) is identified as $C_{min\_min}$.

The code generation module 118 can include one or more of a string select module 130, a minimum detect module 132, and an analog-to-digital converter (ADC) 134. As described in greater detail below with reference to FIGS. 4, 5, 8 and 9, the string select module 130 is configured to output the minimum tail voltage $V_{Tmin}$ of the LED strings 105-107 (which can vary over the PWM cycle), the ADC 134 is configured to convert the magnitude of the minimum tail voltage $V_{Tmin}$ output by the string select module 130 to a corresponding code value $C_{min}$ for each of a sequence of conversion points in the PWM cycle, the minimum detect module 132 is configured as a digital component to detect the minimum code value $C_{min}$ from the plurality of code values $C_{min}$ generated over the PWM cycle as the minimum code value $C_{min\_min}$ for the PWM cycle. Alternately, as described in greater detail below with reference to FIGS. 6 and 7, the minimum detect module 132 is configured as an analog component to determine the minimum tail voltage $V_{Tmin\_min}$ for the PWM cycle from the potentially varying magnitude of the voltage $V_{Tmin}$ output by the string select module 130 over the PWM cycle, and the ADC 134 is configured to perform a single conversion of the voltage $V_{Tmin\_min}$ to the minimum code value $C_{min\_min}$ for the PWM cycle. As another embodiment, as described in greater detail below with reference to FIGS. 10 and 11, the string select module 130 is omitted and the ADC 134 can be configured as multiple ADCs. Each ADC is configured to repeatedly convert the tail voltage of a corresponding one of the LED strings 105-107 into a series of code values $C_{min}$ having magnitudes representative of the magnitude of the tail voltage at the time of the conversion. In this instance, the minimum detect module 132 is configured as a digital component to determine the minimum of the code values $C_{min}$ generated from all of the ADCs to identify the minimum code value $C_{min\_min}$ over the PWM cycle.

The code processing module 120 includes an input to receive the code value $C_{min\_min}$ and an output to provide a code value $C_{reg}$ based on the code value $C_{min\_min}$ and either a previous value for $C_{reg}$ from a previous PWM cycle or an initialization value. As the code value $C_{min\_min}$ represents the minimum tail voltage $V_{Tmin\_min}$ that occurred during the PWM cycle for all of the LED strings 105-107, the code processing module 120, in one embodiment, compares the code value $C_{min\_min}$ to a threshold code value, $C_{thresh}$, and generates a code value $C_{reg}$ based on the comparison. The code processing module 120 can be implemented as hardware, software executed by one or more processors, or a combination thereof. To illustrate, the code processing module 120 can be implemented as a logic-based hardware state machine, software executed by a processor, and the like. Example implementations of the code generation module 118 and the code processing module 120 are described in greater detail with reference to FIGS. 4-11.

In certain instances, none of the LED strings 105-107 may be enabled for a given PWM cycle. Thus, to prevent an erroneous adjustment of the output voltage $V_{OUT}$ when all LED strings are disabled, in one embodiment the data/timing control module 128 signals the code processing module 120 to suppress any updated code value $C_{reg}$ determined during a PWM cycle in which all LED strings are disabled, and instead use the code value $C_{reg}$ from the previous PWM cycle.

The control DAC 122 includes an input to receive the code value $C_{reg}$ and an output to provide a regulation voltage $V_{reg}$ representative of the code value $C_{reg}$. The regulation voltage $V_{reg}$ is provided to the error amplifier 124. The error amplifier 124 also receives a feedback voltage $V_{fb}$ representative of the output voltage $V_{OUT}$. In the illustrated embodiment, a voltage divider 126 implemented by resistors 128 and 130 is used to generate the voltage $V_{fb}$ from the output voltage $V_{OUT}$. The error amplifier 124 compares the voltage $V_{fb}$ and the voltage $V_{reg}$ and configures a signal ADJ based on this comparison. The boost converter 112 receives the signal ADJ and adjusts the output voltage $V_{OUT}$ based on the magnitude of the signal ADJ.

As similarly described above, there may be considerable variation between the voltage drops across each of the LED strings 105-107 due to static variations in forward-voltage biases of the LEDs 108 of each LED string and dynamic variations due to the on/off cycling of the LEDs 108. Thus, there may be significant variance in the bias voltages needed to properly operate the LED strings 105-107. However, rather than drive a fixed output voltage $V_{OUT}$ that is substantially higher than what is needed for the smallest voltage drop as this is handled in conventional LED drivers, the LED driver 104 illustrated in FIG. 1 utilizes a feedback mechanism that permits the output voltage $V_{OUT}$ to be adjusted so as to reduce or minimize the power consumption of the LED driver 104 in the presence of variances in voltage drop across the LED strings 105-107, as described below with reference to the methods 200 and 300 of FIG. 2 and FIG. 3, respectively. For ease of discussion, the feedback duration of this mechanism is described in the context of a PWM cycle-by-PWM cycle basis for adjusting the output voltage $V_{OUT}$. However, any of a variety of durations may be used for this feedback mechanism without departing from the scope of the present disclosure. To illustrate, the feedback duration could encompass a portion of a PWM cycle, multiple PWM cycles, a certain number of clock cycles, a duration between interrupts, and the like.

Figure 2:
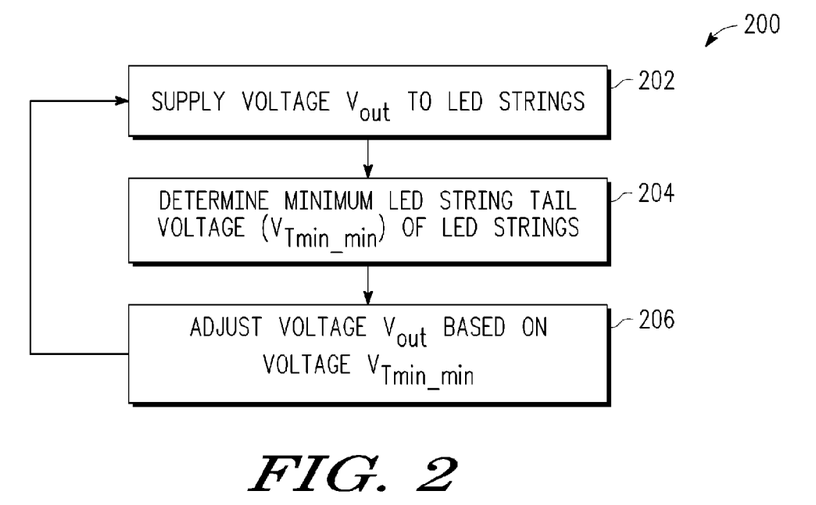
FIG. 2 is a flow diagram illustrating a method of operation of the LED system of FIG. 1 in accordance with at least one embodiment of the present disclosure.

FIG. 2 illustrates an example method 200 of operation of the LED system 100 in accordance with at least one embodiment of the present disclosure. At block 202, the boost converter 112 provides an initial output voltage $V_{OUT}$. As the PWM data for a given PWM cycle is received, the data/timing control module 128 configures the control signals $C_1$, $C_2$, and $C_n$ so as to selectively activate the LED strings 105-107 at the appropriate times of their respective PWM cycles. Over the course of the PWM cycle, the code generation module 118 determines the minimum detected tail voltage ($V_{Tmin\_min}$) for the LED tails 105-107 for the PWM cycle at block 204. At block 206, the feedback controller 114 configures the signal ADJ based on the voltage $V_{Tmin\_min}$ to adjust the output voltage $V_{OUT}$, which in turn adjusts the tail voltages of the LED strings 105-107 so that the minimum tail voltage $V_{Tmin}$ of the LED strings 105-107 is closer to a predetermined threshold voltage. The process of blocks 202-206 can be repeated for the next PWM cycle, and so forth.

As a non-zero tail voltage for a LED string indicates that more power is being used to drive the LED string than is absolutely necessary, it typically is advantageous for power consumption purposes for the feedback controller 114 to manipulate the boost converter 112 to adjust the output voltage $V_{OUT}$ until the minimum tail voltage $V_{Tmin\_min}$ would be approximately zero, thereby eliminating nearly all excess power consumption that can be eliminated without disturbing the proper operation of the LED strings. Accordingly, in one embodiment, the feedback controller 114 configures the signal ADJ so as to reduce the output voltage $V_{OUT}$ by an amount expected to cause the minimum tail voltage $V_{Tmin\_min}$ of the LED strings 105-107 to be at or near zero volts.

However, while being advantageous from a power consumption standpoint, having a near-zero tail voltage on a LED string introduces potential problems. As one issue, the current regulators 115-117 may need non-zero tail voltages to operate properly. Further, it will be appreciated that a near-zero tail voltage provides little or no margin for spurious increases in the bias voltage needed to drive the LED string resulting from self-heating or other dynamic influences on the LEDs 108 of the LED strings 105-107. Accordingly, in at least one embodiment, the feedback controller 114 can achieve a suitable compromise between reduction of power consumption and the response time of the LED driver 104 by adjusting the output voltage $V_{OUT}$ so that the expected minimum tail voltage of the LED strings 105-107 is maintained at or near a non-zero threshold voltage $V_{thresh}$ that represents an acceptable compromise between PWM response time and reduced power consumption. The threshold voltage $V_{thresh}$ can be implemented as, for example, a voltage between 0.2 V and 1 V (e.g., 0.5 V).

Figure 3:
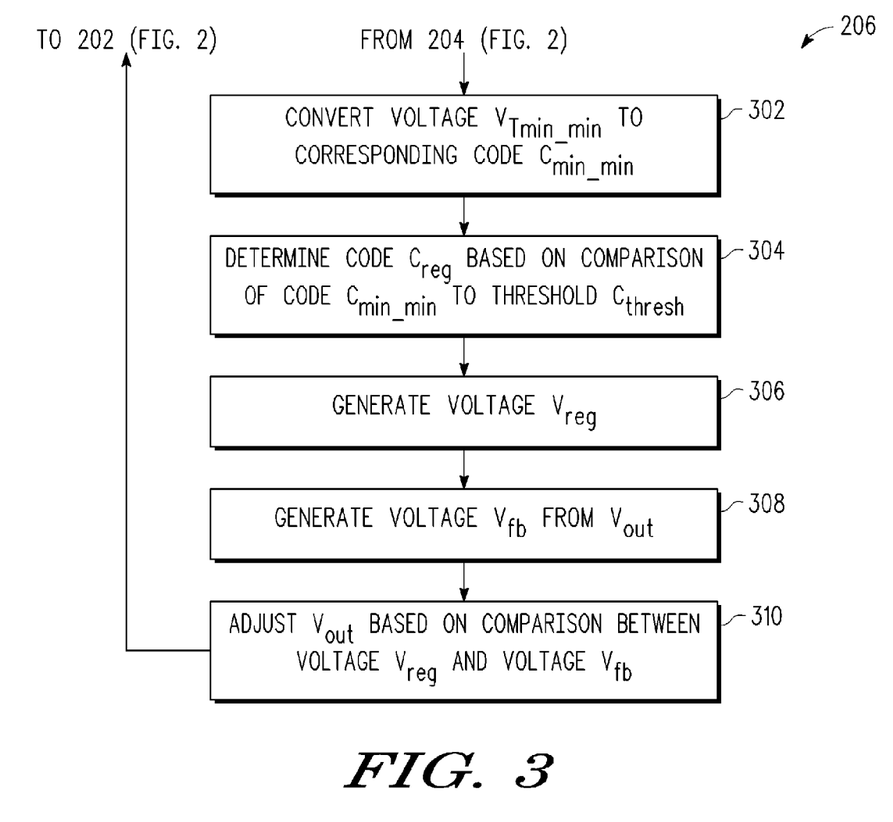
FIG. 3 is a flow diagram illustrating the method of FIG. 2 in greater detail in accordance with at least one embodiment of the present disclosure.

FIG. 3 illustrates a particular implementation of the process represented by block 206 of the method 200 of FIG. 2 in accordance with at least one embodiment of the present disclosure. As described above, at block 204 (FIG. 2) of the method 200, the code generation module 118 monitors the tail voltages $V_{T1}$, $V_{T2}$, and $V_{Tn}$ of the LED tails 105-107 to identify the minimum detected tail voltage $V_{Tmin\_min}$ for the PWM cycle. At block 302, the code generation module 118 converts the voltage $V_{Tmin\_min}$ to a corresponding digital code value $C_{min\_min}$. Thus, the code value $C_{min\_min}$ is a digital value representing the minimum tail voltage $V_{Tmin\_min}$ detected during the PWM cycle. As described in greater detail herein, the detection of the minimum tail voltage $V_{Tmin\_min}$ can be determined in the analog domain and then converted to a digital value, or the detection of the minimum tail voltage $V_{Tmin\_min}$ can be determined in the digital domain based on the identification of the minimum code value $C_{min\_min}$ from a plurality of code values $C_{min}$ representing the minimum tail voltage $V_{Tmin}$ at various points over the PWM cycle.

At block 304, the code processing module 120 compares the code value $C_{min\_min}$ with a code value $C_{thresh}$ to determine the relationship of the minimum tail voltage $V_{Tmin\_min}$ (represented by the code value $C_{min\_min}$) to the threshold voltage $V_{thresh}$ (represented by the code value $C_{thresh}$). As described above, the feedback controller 114 is configured to control the boost converter 112 so as to maintain the minimum tail voltage of the LED strings 105-107 at or near a threshold voltage $V_{thresh}$ during the corresponding PWM cycle. The voltage $V_{thresh}$ can be at or near zero volts to maximize the reduction in power consumption or it can be a non-zero voltage (e.g., 0.5 V) so as to comply with PWM performance requirements and current regulation requirements while still reducing power consumption.

The code processing module 120 generates a code value $C_{reg}$ based on the relationship of the minimum tail voltage $V_{Tmin\_min}$ to the threshold voltage $V_{thresh}$ revealed by the comparison of the code value $C_{min\_min}$ to the code value $C_{thresh}$. As described herein, the value of the code value $C_{reg}$ affects the resulting change in the output voltage $V_{OUT}$. Thus, when the code value $C_{min\_min}$ is greater than the code value $C_{thresh}$, a value for $C_{reg}$ is generated so as to reduce the output voltage $V_{OUT}$, which in turn is expected to reduce the minimum tail voltage $V_{Tmin}$ closer to the threshold voltage $V_{thresh}$. To illustrate, the code processing module 120 compares the code value $C_{min\_min}$ to the code value $C_{thresh}$. If the code value $C_{min\_min}$ is less than the code value $C_{thresh}$, an updated value for $C_{reg}$ is generated so as to increase the output voltage $V_{OUT}$, which in turn is expected to increase the minimum tail voltage $V_{Tmin\_min}$ closer to the threshold voltage $V_{thresh}$. Conversely, if the code value $C_{min\_min}$ is greater than the code value $C_{thresh}$, an updated value for $C_{reg}$ is generated so as to decrease the output voltage $V_{OUT}$, which in turn is expected to decrease the minimum tail voltage $V_{Tmin\_min}$ closer to the threshold voltage $V_{thresh}$. To illustrate, the updated value for $C_{reg}$ can be set to $$C_{reg}(\text{updated}) = C_{reg}(\text{current}) + \textit{offset}1 \qquad \text{EQ. 1}$$

$$\textit{offset}1 = \frac{R_{f2}}{R_{f1} + R_{f2}} \times \frac{(C_{thresh} - C_{min\_min})}{\text{Gain\_ADC} \times \text{Gain\_DAC}} \qquad \text{EQ. 2}$$

whereby $R_{f1}$ and $R_{f2}$ represent the resistances of the resistor 128 and the resistor 130, respectively, of the voltage divider 126 and Gain_ADC represents the gain of the ADC (in units code per volt) and Gain_DAC represents the gain of the control DAC 122 (in unit of volts per code). Depending on the relationship between the voltage $V_{Tmin\_min}$ and the voltage $V_{thresh}$ (or the code value $C_{min\_min}$ and the code value $C_{thresh}$), the offset1 value can be either positive or negative.

Alternately, when the code $C_{min\_min}$ indicates that the minimum tail voltage $V_{Tmin\_min}$ is at or near zero volts (e.g., $C_{min\_min}=0$) the value for updated $C_{reg}$ can be set to $$C_{reg}(\text{updated}) = C_{reg}(\text{current}) + \text{offset2} \qquad \text{EQ. 3}$$

whereby offset2 corresponds to a predetermined voltage increase in the output voltage $V_{OUT}$ (e.g., 1 V increase) so as to affect a greater increase in the minimum tail voltage $V_{Tmin\_min}$.

At block 306, the control DAC 122 converts the updated code value $C_{reg}$ to its corresponding updated regulation voltage $V_{reg}$. At block 308, the feedback voltage $V_{fb}$ is obtained from the voltage divider 126. At block 310, error amplifier 124 compares the voltage $V_{reg}$ and the voltage $V_{fb}$ and configures the signal ADJ so as to direct the boost converter 112 to increase or decrease the output voltage $V_{OUT}$ depending on the result of the comparison as described above. The process of blocks 302-310 can be repeated for the next PWM cycle, and so forth.

Figure 4:
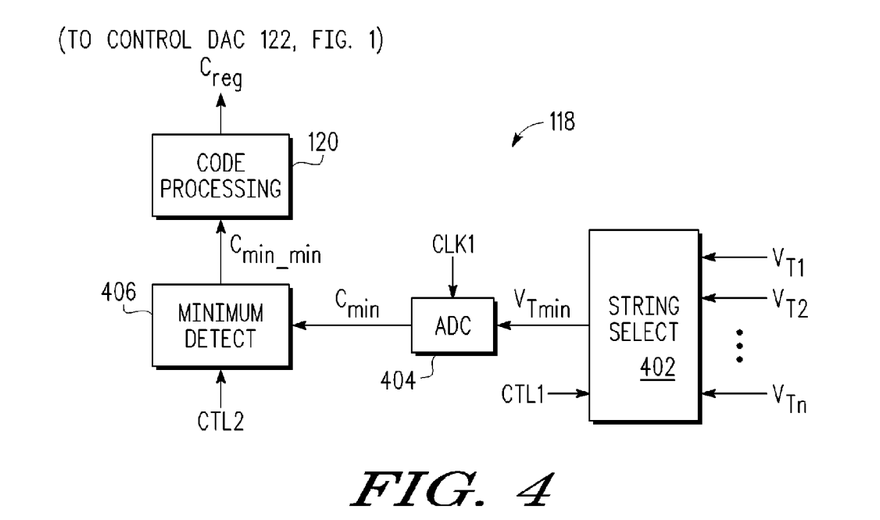
FIG. 4 is a diagram illustrating an example implementation of a feedback controller of the LED system of FIG. 1 in accordance with at least one embodiment of the present disclosure.

FIG. 4 illustrates a particular implementation of the code generation module 118 and the code processing module 120 of the LED driver 104 of FIG. 1 in accordance with at least one embodiment of the present disclosure. In the illustrated embodiment, the code generation module 118 includes an analog string select module 402 (corresponding to the string select module 130, FIG. 1), an analog-to-digital converter (ADC) 404 (corresponding to the ADC 134, FIG. 1), and a digital minimum detect module 406 (corresponding to the minimum detect module 132, FIG. 1). The analog string select module 402 includes a plurality of inputs coupled to the tail ends of the LED strings 105-107 (FIG. 1) so as to receive the tail voltages $V_{T1}$, $V_{T2}$, and $V_{Tn}$. In one embodiment, the analog string select module 402 is configured to provide the voltage $V_{Tmin}$ that is equal to or representative of the lowest tail voltage of the active LED strings at the corresponding point in time of the PWM cycle. That is, rather than supplying a single voltage value at the conclusion of a PWM cycle, the voltage $V_{Tmin}$ output by the analog string select module 402 varies throughout the PWM cycle as the minimum tail voltage of the LED strings changes at various points in time of the PWM cycle.

The analog string select module 402 can be implemented in any of a variety of manners. For example, the analog string select module 402 can be implemented as a plurality of semiconductor p-n junction diodes, each diode coupled in a reverse-polarity configuration between a corresponding tail voltage input and the output of the analog string select module 402 such that the output of the analog string select module 402 is always equal to the minimum tail voltage $V_{Tmin}$ where the offset from voltage drop of the diodes (e.g., 0.5 V or 0.7 V) can be compensated for using any of a variety of techniques.

The ADC 404 has an input coupled to the output of the analog string select module 402, an input to receive a clock signal CLK1, and an output to provide a sequence of code values $C_{min}$ over the course of the PWM cycle based on the magnitude of the minimum tail voltage $V_{Tmin}$ at respective points in time of the PWM cycle (as clocked by the clock signal CLK1). The number of code values $C_{min}$ generated over the course of the PWM cycle depends on the frequency of the clock signal CLK1. To illustrate, if the clock signal CLK1 has a frequency of 1000*CLK_PWM (where CLK_PWM is the frequency of the PWM cycle) and can convert the magnitude of the voltage $V_{Tmin}$ to a corresponding code value $C_{min}$ at a rate of one conversion per clock cycle, the ADC 404 can produce 1000 code values $C_{min}$ over the course of the PWM cycle.

The digital minimum detect module 406 receives the sequence of code values $C_{min}$ generated over the course of the PWM cycle by the ADC 404 and determines the minimum, or lowest, of these code values for the PWM cycle. To illustrate, the digital minimum detect module 406 can include, for example, a buffer, a comparator, and control logic configured to overwrite a code value $C_{min}$ stored in the buffer with an incoming code value $C_{min}$ if the incoming code value $C_{min}$ is less than the one in the buffer. The digital minimum detect module 406 provides the minimum code value $C_{min}$ of the series of code values $C_{min}$ for the PWM cycle as the code value $C_{min\_min}$ to the code processing module 120. The code processing module 120 compares the code value $C_{min\_min}$ to the predetermined code value $C_{thresh}$ and generates an updated code value $C_{reg}$ based on the comparison as described in greater detail above with reference to block 304 of FIG. 3.

Figure 5:
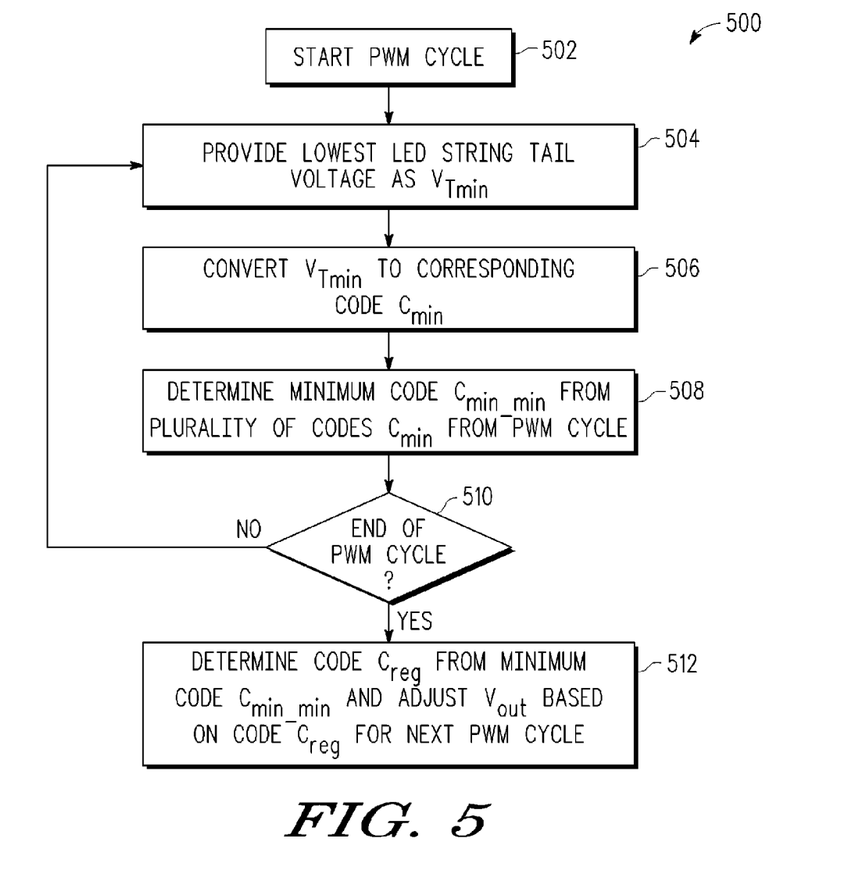
FIG. 5 is a flow diagram illustrating a method of operation of the example implementation of FIG. 4 in accordance with at least one embodiment of the present disclosure.

FIG. 5 illustrates an example method 500 of operation of the implementation of the LED system 100 illustrated in FIGS. 1 and 4 in accordance with at least one embodiment of the present disclosure. At block 502, a PWM cycle starts, as indicated by the received PWM data (FIG. 1). At block 504, the analog string select module 402 provides the minimum tail voltage of the LED strings at a point in time of the PWM cycle as the voltage $V_{Tmin}$ for that point in time. At block 506, the ADC 404 converts the voltage $V_{Tmin}$ to a corresponding code value $C_{min}$ and provides it to the digital minimum detect 406 for consideration as the minimum code value $C_{min\_min}$ for the PWM cycle thus far at block 508. At block 510, the data/timing control module 128 determines whether the end of the PWM cycle has been reached. If not, the process of blocks 504-508 is repeated to generate another code value $C_{min}$. Otherwise, if the PWM cycle has ended, the minimum code value $C_{min}$ of the plurality of code values $C_{min}$ generated during the PWM cycle is provided as the code value $C_{min\_min}$ by the digital minimum detect module 406. In an alternate embodiment, the plurality of code values $C_{min}$ generated during the PWM cycle are buffered and then the minimum value $C_{min\_min}$ is determined at the end of the PWM cycle from the plurality of buffered code values $C_{min}$. At block 512 the code processing module 120 uses the minimum code value $C_{min\_min}$ to generate an updated code value $C_{reg}$ based on a comparison of the code value $C_{min\_min}$ to the predetermined code value $C_{thresh}$. The control DAC 122 uses the updated code value $C_{reg}$ to generate the corresponding voltage $V_{reg}$, which is used by the error amplifier 124 along with the voltage $V_{fb}$ to adjust the output voltage $V_{OUT}$ as described above.

Figure 6:
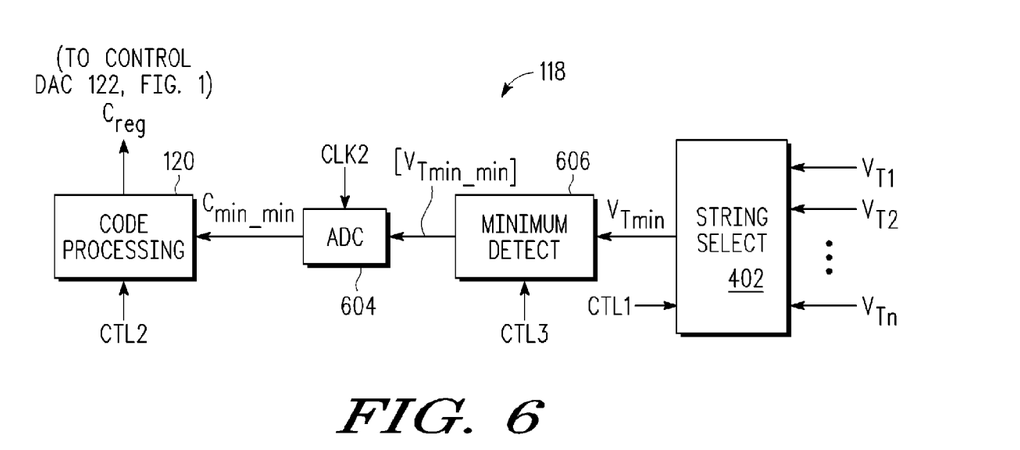
FIG. 6 is a diagram illustrating another example implementation of the feedback controller of the LED system of FIG. 1 in accordance with at least one embodiment of the present disclosure.

FIG. 6 illustrates another example implementation of the code generation module 118 and the code processing module 120 of the LED driver 104 of FIG. 1 in accordance with at least one embodiment of the present disclosure. In the illustrated embodiment, the code generation module 118 includes the analog string select module 402 as described above, an analog minimum detect module 606 (corresponding to the minimum detect module 132, FIG. 1), and an ADC 604 (corresponding to the ADC 134, FIG. 1). As described above, the analog string select module 402 continuously selects and outputs the minimum tail voltage of the LED strings 105-107 at any given time as the voltage $V_{Tmin}$ for that point in time. The analog minimum detect module 606 includes an input coupled to the output of the analog string select module 402, an input to receive a control signal CTL3 from the data/timing control module 128 (FIG. 1), where the control signal CTL3 signals the start and end of each PWM cycle. In at least one embodiment, the analog minimum detect module 606 detects the minimum voltage of the output of the analog string select module 402 over the course of a PWM cycle and outputs the minimum detected voltage as the minimum tail voltage $V_{Tmin\_min}$.

The analog minimum detect module 606 can be implemented in any of a variety of manners. To illustrate, in one embodiment, the analog minimum detect module 606 can be implemented as a negative peak voltage detector that is accessed and then reset at the end of each PWM cycle. Alternately, the analog minimum detect module 606 can be implemented as a set of sample-and-hold circuits, a comparator, and control logic. One of the sample-and-hold circuits is used to sample and hold the voltage $V_{Tmin}$ and the comparator is used to compare the sampled voltage with a sampled voltage held in a second sample-and-hold circuit. If the voltage of the first sample-and-hold circuit is lower, the control logic switches to using the second sample-and-hold circuit for sampling the voltage $V_{Tmin}$ for comparison with the voltage held in the first sample-and-hold circuit, and so on.

The ADC 604 includes an input to receive the minimum tail voltage $V_{Tmin\_min}$ for the corresponding PWM cycle and an input to receive a clock signal CLK2. The ADC 604 is configured to generate the code value $C_{min\_min}$ representing the minimum tail voltage $V_{Tmin\_min}$ and provide the code value $C_{min\_min}$ to the code processing module 120, whereby it is compared with the predetermined code value $C_{thresh}$ to generate the appropriate code value $C_{reg}$ as described above.

Figure 7:
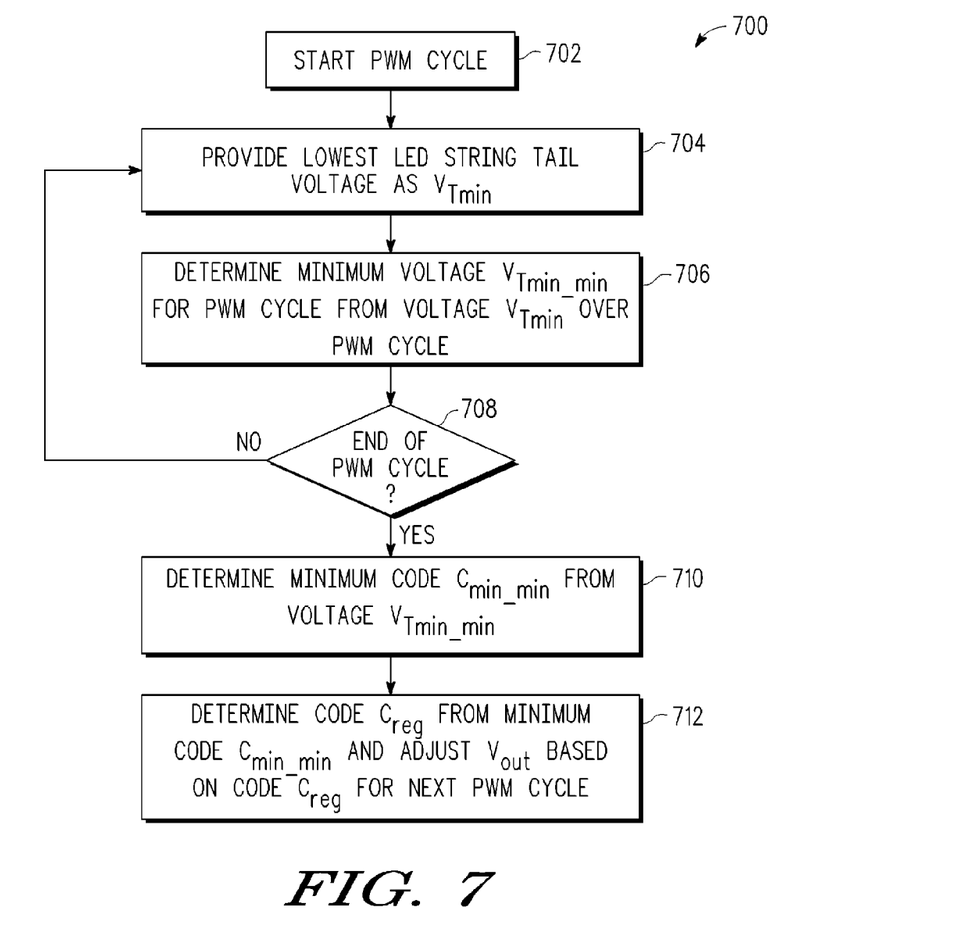
FIG. 7 is a flow diagram illustrating a method of operation of the example implementation of FIG. 6 in accordance with at least one embodiment of the present disclosure.

FIG. 7 illustrates an example method 700 of operation of the implementation of the LED system 100 illustrated in FIGS. 1 and 6 in accordance with at least one embodiment of the present disclosure. At block 702, a PWM cycle starts, as indicated by the received PWM data (FIG. 1). At block 704, the analog string select module 402 provides the lowest tail voltage of the active LED strings at a given point in time of the PWM cycle as the voltage $V_{Tmin}$ for that point in time. At block 706, the minimum magnitude of the voltage $V_{Tmin}$ detected by the analog minimum detect module 606 is identified as the minimum tail voltage $V_{Tmin\_min}$ for the PWM cycle thus far. At block 708, the data/timing control module 128 determines whether the end of the PWM cycle has been reached. If the PWM cycle has ended, the ADC 604 converts the minimum tail voltage $V_{Tmin\_min}$ to the corresponding code value $C_{min\_min}$. At block 712, the code processing module 120 converts the code value $C_{min\_min}$ to an updated code value $C_{reg}$ based on a comparison of the code value $C_{min\_min}$ to the predetermined code value $C_{thresh}$. The control DAC 122 converts the updated code value $C_{reg}$ to the corresponding voltage $V_{reg}$, which is used by the error amplifier 124 along with the voltage $V_{fb}$ to adjust the output voltage $V_{OUT}$ as described above.

In the implementation of FIGS. 4 and 5, the voltage $V_{Tmin}$ output by the analog string select module 402 was converted into a sequence of code values $C_{min}$ based on the clock signal CLK1 and the sequence of code values $C_{min}$ was analyzed to determine the minimum code value of the sequence, and thus to determine the code value $C_{min\_min}$ representative of the minimum tail voltage $V_{Tmin\_min}$ occurring over a PWM cycle. Such an implementation requires an ADC 404 capable of operating with a high-frequency clock CLK1. The implementation of FIGS. 6 and 7 illustrates an alternate with relaxed ADC and clock frequency requirements because the minimum tail voltage $V_{Tmin\_min}$ over a PWM cycle is determined in the analog domain and thus only a single analog-to-digital conversion is required from the ADC 604 per PWM cycle, at the cost of adding the analog minimum detect module 606.

Figure 8:
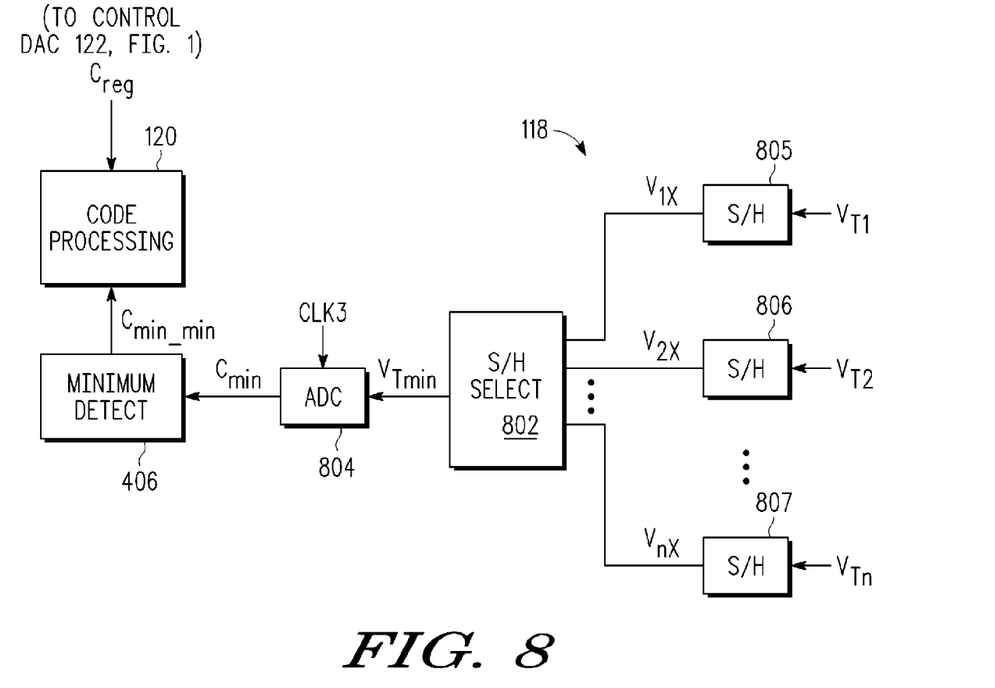
FIG. 8 is a diagram illustrating another example implementation of the feedback controller of the LED system of FIG. 1 in accordance with at least one embodiment of the present disclosure.

FIG. 8 illustrates yet another example implementation of the code generation module 118 and the code processing module 120 of the LED driver 104 of FIG. 1 in accordance with at least one embodiment of the present disclosure. In the illustrated embodiment, the code generation module 118 includes a plurality of sample-and-hold (S/H) circuits, such as S/H circuits 805, 806, and 807, a S/H select module 802 (corresponding to the string select module 130, FIG. 1), an ADC 804 (corresponding to the ADC 134, FIG. 1), and the digital minimum detect module 406 (described above).

Each of the S/H circuits 805-807 includes an input coupled to the tail end of a respective one of the LED strings 105-107 (FIG. 1) to receive the tail voltage of the LED string and an output to provide a sampled tail voltage of the respective LED string. In FIG. 8, the sampled voltages output by the S/H circuits 805-807 are identified as voltages $V_{1X}$, $V_{2X}$, and $V_{nX}$, respectively. In at least one embodiment, a control signal for a corresponding S/H circuit is enabled, thereby enabling sampling of the corresponding tail voltage, when the corresponding LED string is activated by a PWM pulse.

The S/H select module 802 includes a plurality of inputs to receive the sampled voltages $V_{1X}$, $V_{2X}$, and $V_{1X}$ and is configured to select the minimum, or lowest, of the sampled voltages $V_{1X}$, $V_{2X}$, and $V_{nX}$ at any given sample period for output as the voltage level of the voltage $V_{Tmin}$ for the sample point. The S/H select module 802 can be configured in a manner similar to the analog string select module 402 of FIGS. 4 and 6. The ADC 804 includes an input to receive the voltage $V_{Tmin}$ and an input to receive a clock signal CLK3. As similarly described above with respect to the ADC 404 of FIG. 4, the ADC 804 is configured to output a sequence of code values $C_{min}$ from the magnitude of the voltage $V_{Tmin}$ using the clock signal CLK3.

As described above, the digital minimum detect module 406 receives the stream of code values $C_{min}$ for a PWM cycle, determines the minimum code value of the stream, and provides the minimum code value as code value $C_{min\_min}$ to the code processing module 120. The determination of the minimum code value $C_{min\_min}$ can be updated as the PWM cycle progresses, or the stream of code values $C_{min}$ for the PWM cycle can be buffered and the minimum code value $C_{min\_min}$ determined at the end of the PWM cycle from the buffered stream of code values $C_{min}$. The code processing module then compares the code value $C_{min\_min}$ to the predetermined code value $C_{thresh}$ for the purpose of updating the code value $C_{reg}$.

Figure 9:
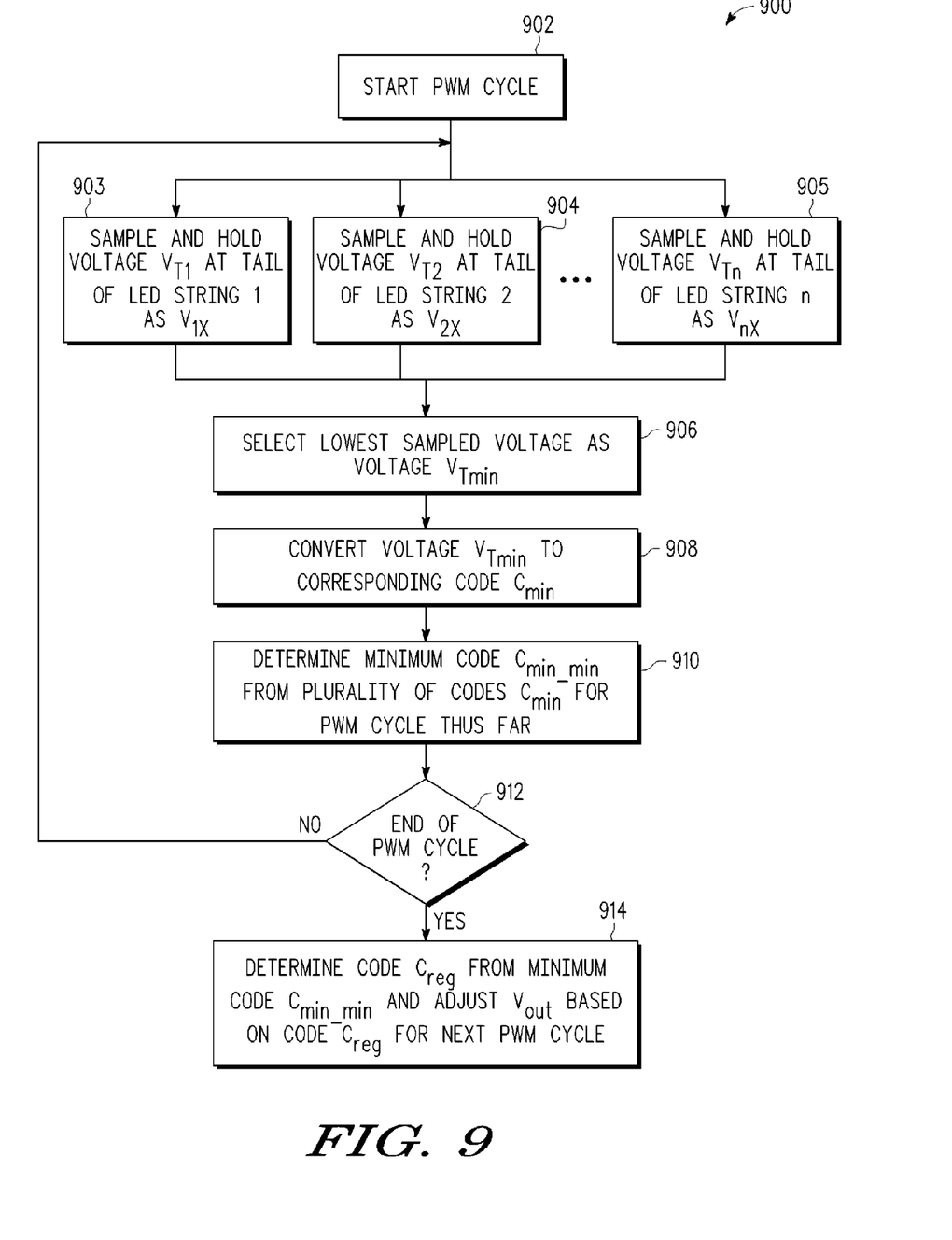
FIG. 9 is a flow diagram illustrating a method of operation of the example implementation of FIG. 8 in accordance with at least one embodiment of the present disclosure.

FIG. 9 illustrates an example method 900 of operation of the implementation of the LED system 100 illustrated in FIGS. 1 and 8 in accordance with at least one embodiment of the present disclosure. At block 902, a PWM cycle starts, as indicated by the received PWM data (FIG. 1). At block 903, the S/H circuit 805 samples and holds the voltage level of the tail end of the LED string 105 as the voltage $V_{1X}$ when the LED string 105 (e.g., when activated by a PWM pulse). Likewise, at block 904 the S/H circuit 806 samples and holds the voltage level of the tail end of the LED string 106 as the voltage $V_{2X}$ when the LED string 106 is activated by a PWM pulse, and at block 905 the S/H circuit 807 samples and holds the voltage level of the tail end of the LED string 107 as the voltage $V_{nX}$ when the LED string 107 is activated by a PWM pulse.

At block 906, the S/H select module 802 selects the minimum of the sampled voltages $V_{1X}$, $V_{2X}$, and $V_{1X}$ for output as the voltage $V_{Tmin}$. At block 908, the ADC 804 converts the magnitude of the voltage $V_{Tmin}$ at the corresponding sample point to the corresponding code value $C_{min}$ and provides the code value $C_{min}$ to the digital minimum detect module 406. At block 910, the digital minimum detect module 406 determines the minimum code value of the plurality of code values $C_{min}$ generated during the PWM cycle thus far as the minimum code value $C_{min\_min}$. At block 912, the data/timing control module 128 determines whether the end of the PWM cycle has been reached. If not, the process of blocks 903, 904, 905, 906, 908, and 910 is repeated to generate another code value $C_{min}$ and update the minimum code value $C_{min\_min}$ as necessary. Otherwise, if the PWM cycle has ended, at block 914, the code processing module 120 converts the code value $C_{min\_min}$ to an updated code value $C_{reg}$ based on a comparison of the code value $C_{min\_min}$ to the predetermined code value $C_{thresh}$. The control DAC 122 converts the updated code value $C_{reg}$ to the corresponding voltage $V_{reg}$, which is used by the error amplifier 124 along with the voltage $V_{fb}$ to adjust the output voltage $V_{OUT}$ as described above.

Figure 10:
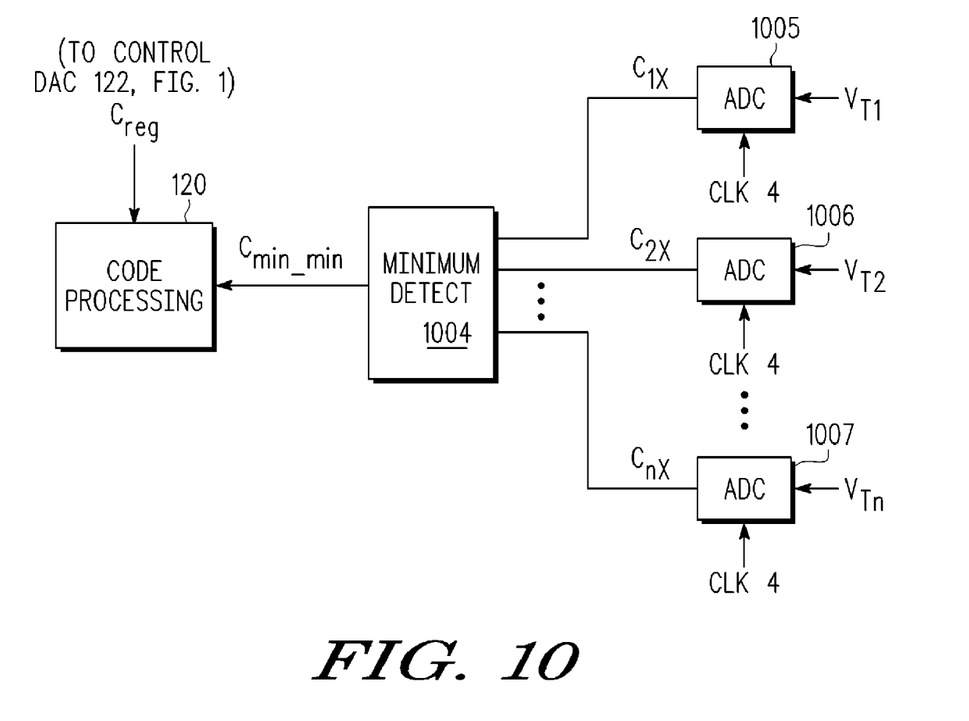
FIG. 10 is a diagram illustrating another example implementation of the feedback controller of the LED system of FIG. 1 in accordance with at least one embodiment of the present disclosure.

FIG. 10 illustrates another example implementation of the code generation module 118 and the code processing module 120 of the LED driver 104 of FIG. 1 in accordance with at least one embodiment of the present disclosure. In the illustrated embodiment, the code generation module 118 includes a plurality of ADCs, such as ADC 1005, ADC 1006, and ADC 1007 (corresponding to the ADC 134, FIG. 1) and a digital minimum detect module 1004 (corresponding to both the string select module 130 and the minimum detect module 132, FIG. 1).

Each of the ADCs 1005-1007 includes an input coupled to the tail end of a respective one of the LED strings 105-107 (FIG. 1) to receive the tail voltage of the LED string, an input to receive a clock signal CLK4, and an output to provide a stream of code values generated from the input tail voltage. In FIG. 10, the code values output by the ADCs 1005-1007 are identified as code values $C_{1X}$, $C_{2X}$, and $C_{nX}$, respectively.

The digital minimum detect module 1004 includes an input for each of the stream of code values output by the ADCs 1005-1007 and is configured to determine the minimum, or lowest, code value from all of the streams of code values for a PWM cycle. In one embodiment, the minimum code value for each LED string for the PWM cycle is determined and then the minimum code value $C_{min\_min}$ is determined from the minimum code value for each LED string. In another embodiment, the minimum code value of each LED string is determined at each sample point (e.g., the minimum of $C_{1X}$, $C_{2X}$, and $C_{nX}$ at the sample point). The code processing module 120 then compares the code value $C_{min\_min}$ to the predetermined code value $C_{thresh}$ for the purpose of updating the code value $C_{reg}$.

Figure 11:
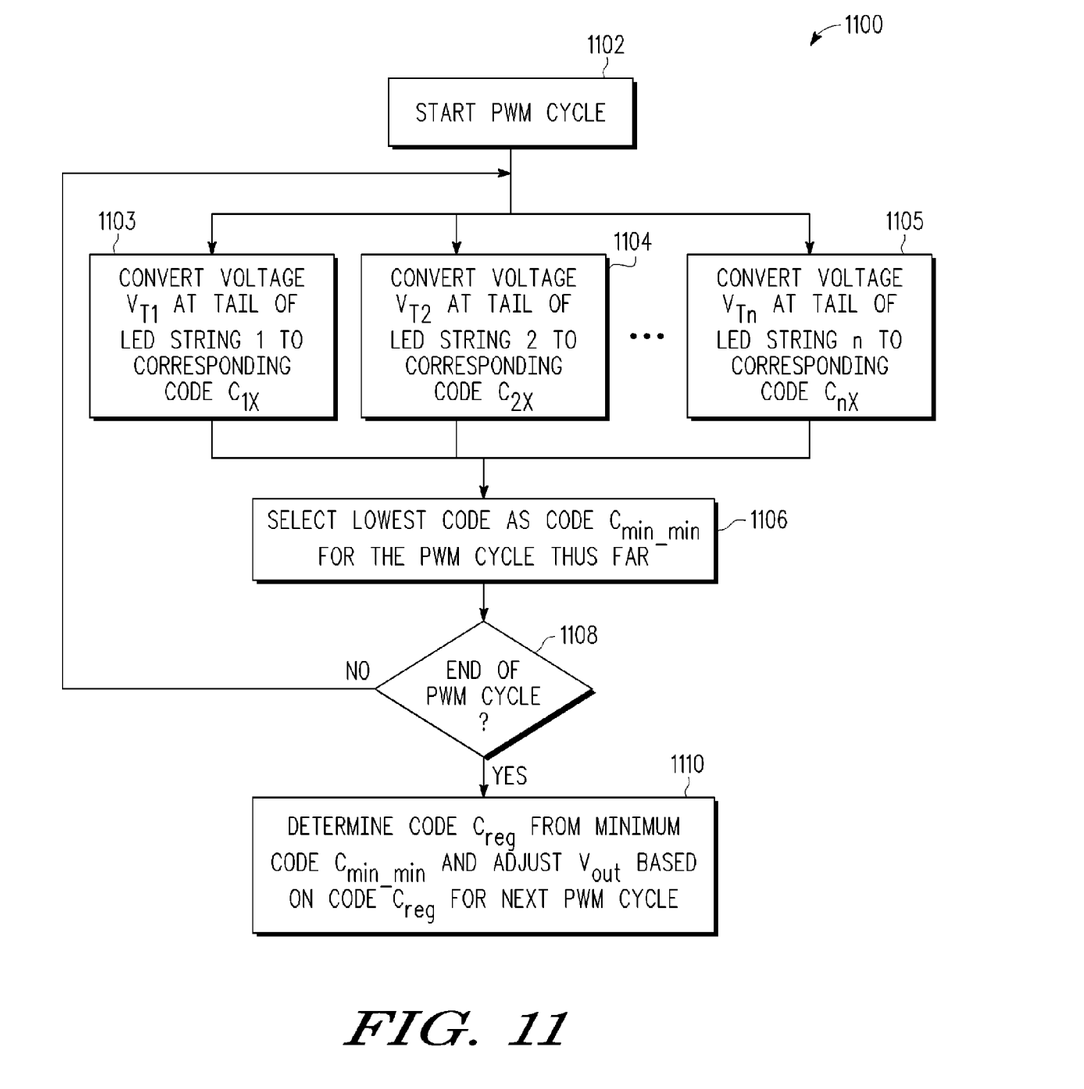
FIG. 11 is a flow diagram illustrating a method of operation of the example implementation of FIG. 10 in accordance with at least one embodiment of the present disclosure.

FIG. 11 illustrates an example method 1100 of operation of the implementation of the LED system 100 illustrated in FIGS. 1 and 10 in accordance with at least one embodiment of the present disclosure. At block 1102, a PWM cycle starts, as indicated by the received PWM data (FIG. 1). At block 1103, the ADC 1005 converts the voltage $V_{T1}$ at the tail end of the LED string 105 to a corresponding code value $C_{1X}$ when the LED string 105 (e.g., when activated by a PWM pulse). Likewise, at block 1004 the ADC 1006 converts the voltage $V_{T2}$ at the tail end of the LED string 106 to a corresponding code value $C_{2X}$ when the LED string 106 is activated by a PWM pulse, and at block 1005 the ADC 1007 converts the voltage $V_{Tn}$ at the tail end of the LED string 107 to a corresponding code value $C_{nX}$ when the LED string 107 is activated by a PWM pulse.

At block 1106, the digital minimum detect module 1004 determines the minimum code value $C_{min\_min}$ of the plurality of code values generated during the PWM cycle thus far, or, in an alternate embodiment, at the end of the PWM cycle from the code values generated over the entire PWM cycle. At block 1108, the data/timing control module 128 determines whether the end of the PWM cycle has been reached. If not, the process of blocks 1103, 1104, 1105, 1106, and 1108 is repeated to generate another set of code values from the tail voltages of the active LED strings and update the minimum code value $C_{min\_min}$ as necessary. Otherwise, if the PWM cycle has ended, at block 1110, the code processing module 120 converts the code value $C_{min\_min}$ to an updated code value $C_{reg}$ based on a comparison of the code value $C_{min\_min}$ to the predetermined code value $C_{thresh}$. The control DAC 122 converts the updated code value $C_{reg}$ to the corresponding voltage $V_{reg}$, which is used by the error amplifier 124 along with the voltage $V_{fb}$ to adjust the output voltage $V_{OUT}$ as described above.

Figure 12:
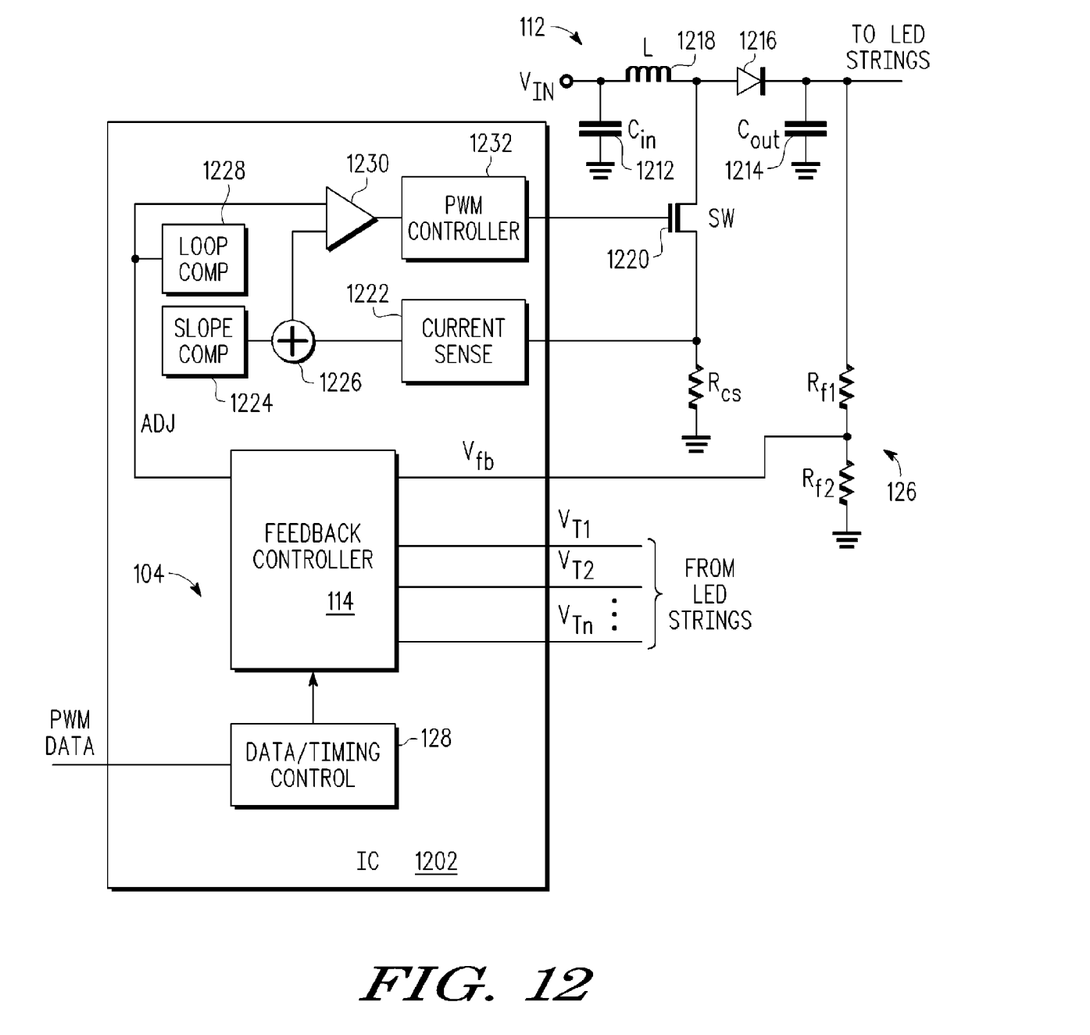
FIG. 12 is a diagram illustrating an integrated circuit (IC)-based implementation of the LED system of FIG. 1 in accordance with at least one embodiment of the present disclosure.

FIG. 12 illustrates an IC-based implementation of the LED system 100 of FIG. 1 as well as an example implementation of the boost converter 112 in accordance with at least one embodiment of the present disclosure. In the depicted example, the LED driver 104 is implemented as an integrated circuit (IC) 1202 having the data/timing control module 128 and the feedback controller 114. As also illustrated, some or all of the components of the boost converter 112 can be implemented at the IC 1202. In one embodiment, the boost converter 112 can be implemented as a step-up boost converter, a buck-boost converter, and the like. To illustrate, the boost converter 112 can be implemented with an input capacitor 1212, an output capacitor 1214, a diode 1216, an inductor 1218, a switch 1220, a current sense block 1222, a slope compensator 1224, an adder 1226, a loop compensator 1228, a comparator 1230, and a PWM controller 1232 connected and configured as illustrated in FIG. 12.

The term "another", as used herein, is defined as at least a second or more. The term "subset," as used herein, is defined as one or more of a larger set, inclusive. The terms "including", "having", or any variation thereof, as used herein, are defined as comprising. The term "coupled", as used herein with reference to electro-optical technology, is defined as connected, although not necessarily directly, and not necessarily mechanically.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
providing, for a first duration, a first voltage to a head end of each of a plurality of light emitting diode (LED)

strings, each LED string having a corresponding tail voltage in response to the first voltage;
determining a first minimum tail voltage of the plurality of LED strings for the first duration;
generating a first code value based on the first minimum tail voltage;
generating a second code value based on a comparison of the first code value to a third code value;
generating a second voltage based on the second code value; and
providing, for a second duration subsequent to the first duration, a third voltage to the head end of each of the plurality of LED strings, the third voltage based on the first voltage and the second voltage.

2. The method of claim 1, further comprising:
determining a second minimum tail voltage of the plurality of LED strings for the second duration; and
providing, for a third duration subsequent to the second duration, a fourth voltage to the head end of each of the plurality of LED strings, the fourth voltage based on the third voltage and the second minimum tail voltage.

3. The method of claim 1, wherein providing the second voltage comprises:
determining a relationship between the first minimum tail voltage and a predetermined threshold voltage; and
adjusting the first voltage based on the relationship to generate the third voltage.

4. The method of claim 3, wherein adjusting the first voltage based on the relationship to generate the third voltage comprises:
increasing the first voltage to generate the third voltage in response to determining the first minimum tail voltage is less than the predetermined threshold voltage; and
decreasing the first voltage to generate the third voltage in response to determining the first minimum tail voltage is greater than the predetermined threshold voltage.

5. The method of claim 1, further comprising:
determining a fourth voltage representative of the first voltage; and
adjusting the first voltage based on a comparison of the second voltage and the fourth voltage to generate the third voltage.

6. The method of claim 5, wherein adjusting the first voltage comprises:
increasing the first voltage to generate the third voltage in response to determining the fourth voltage is greater than the second voltage; and
decreasing the first voltage to generate the third voltage in response to determining the fourth voltage is less than the second voltage.

7. The method of claim 5, wherein:
determining the fourth voltage comprises determining the fourth voltage from the first voltage using a voltage divider comprising a first resistor and a second resistor;
generating the second voltage comprises converting the second code value to the second voltage using an digital-to-analog converter (DAC); and
generating the second code value comprises generating the second code value based on a sum of the first code value and an offset value, the offset value based on a resistance of the first resistor, a resistance of the second resistor, and a gain of the DAC.

8. The method of claim 1, wherein generating the first code value based on the first minimum tail voltage comprises:
determining a minimum tail voltage of the plurality of LED strings at each corresponding point in time of the first duration;
generating a sequence of code values, each code value representative of the minimum tail voltage at the corresponding point in time of the first duration; and
determining the first code value as the minimum code value of the sequence of code values.

9. The method of claim 1, wherein generating the first code value based on the first minimum tail voltage comprises:
generating a signal representing a minimum tail voltage of the plurality of LED strings at each corresponding point in time of the first duration;
determining a minimum voltage of the signal for the first duration; and
generating the first code value based on the minimum voltage of the signal.

10. The method of claim 1, wherein generating the first code value based on the first minimum tail voltage comprises:
for each point in time of a sequence of points in time of the first duration:
for each LED string of the plurality of LED strings, sampling the corresponding tail voltage at the point in time to generate a sampled tail voltage for the LED string;
determining the minimum sampled tail voltage of the sampled tail voltages for the point in time; and
converting the minimum sampled tail voltage for the point in time to a corresponding code value of a plurality of code values; and
determining a minimum code value of the plurality of code values as the first code value.

11. The method of claim 1, wherein generating the first code value based on the first minimum tail voltage comprises:
for each LED string of the plurality of LED strings, generating a sequence of code values based on a tail voltage of the LED string at corresponding points of time of the first duration;
determining a minimum code value of the sequences of code values of the LED strings of the plurality of LED strings as the first code value.

12. The method of claim 1, wherein the third code value represents a predetermined threshold voltage for tail voltages of the plurality of LED strings.

13. A system comprising:
a voltage source configured to provide an adjustable output voltage to a head end of each of a plurality of light emitting diode (LED) strings;
a LED driver comprising:
a plurality of tail inputs, each tail input configured to couple to a tail end of a corresponding one of the plurality of LED strings; and
a feedback controller coupled to the plurality of tail inputs and comprising:
a code generation module configured to determine a minimum tail voltage of the plurality of LED strings for a first duration and to convert the minimum tail voltage to a first code value;
a code processing module configured to generate a second code value based on the first code value;
an digital-to-analog converter (DAC) configured to generate a regulation voltage based on the second code value; and
an error amplifier configured to adjust a control signal based on a comparison of the regulation voltage to a feedback voltage representative of the output voltage, wherein the voltage source is configured to adjust the output voltage for a second duration subsequent to the first duration based on the control signal.

14. The system of claim 13, wherein the feedback controller is configured to:
  determine a relationship between the minimum tail voltage and a threshold voltage; and
  control the voltage source to adjust the output voltage based on the relationship.

15. The system of claim 14, wherein the feedback controller is configured to:
  control the voltage source to increase the output voltage in response to determining the minimum tail voltage is less than the threshold voltage; and
  control the voltage source to decrease the output voltage in response to determining the minimum tail voltage is greater than the threshold voltage.

16. The system of claim 13, wherein:
  the feedback voltage comprises a voltage-divided representation of the output voltage using a voltage divider having a first resistor and a second resistor; and
  the code processing module is configured to generate the second code value based on a sum of the first code value and an offset value, the offset value based on a gain of the DAC, a resistance of the first resistor, and a resistance of the second resistor.

17. The system of claim 13, wherein the code generation module comprises:
  an analog string select module configured to generate a signal representing the minimum tail voltage of a first subset of the plurality of LED strings at each corresponding point in time of the first duration;
  an analog-to-digital converter (ADC) configured to generate a sequence of code values based on the signal, each code value representative of a voltage of the signal at a corresponding point in time of the first duration; and
  a digital minimum detect module configured to determine the first code value as the minimum code value of the sequence of code values.

18. The system of claim 13, wherein the code generation module comprises:
  an analog string select module configured to generate a signal representing the lowest tail voltage of a first subset of the plurality of LED strings at each corresponding point in time of the first duration;
  an analog minimum voltage detect module configured to determine the minimum voltage of the signal; and
  an analog-to-digital converter (ADC) configured to convert the minimum voltage of the signal to the first code value.

19. The system of claim 13, wherein the code generation module comprises:
  a plurality of sample-and-hold (S/H) circuits, each S/H circuit configured to sample a tail voltage of a corresponding one of the plurality of LED strings at each point in time of a sequence of points in time of the first duration;
  a S/H select module configured to select the minimum tail voltage of a first subset of the plurality of LED strings from the plurality of S/H circuits at each point in time to generate a sequence of minimum sampled voltages;
  an analog-to-digital converter (ADC) configured to generate a sequence of code values based on the sequence of minimum sampled voltages; and
  a digital minimum detect module configured to select the minimum code value of the sequence of code values as the first code value.

20. The system of claim 13, wherein the code generation module comprises:
  a plurality of analog-to-digital converters (ADCs), each ADC configured to generate a sequence of code values based on a tail voltage of a corresponding one of a first subset of the plurality of LED strings over the first duration; and
  a digital minimum detect module configured to select the minimum code value of the sequences of code values from the plurality of ADCs as the first code value.

* * * * *